United States Patent [19]
Anezaki

[11] Patent Number: 5,613,100
[45] Date of Patent: Mar. 18, 1997

[54] COMPUTER SYSTEM HAVING AN OPEN SYSTEMS INTERCONNECTION (OSI) MANAGEMENT SYSTEM FOR AN INFORMATION CONVERSION FOR MANAGEMENT OF NON-OPEN SYSTEMS

[75] Inventor: Akihiro Anezaki, Tokyo, Japan

[73] Assignee: NEC Corporation, Tokyo, Japan

[21] Appl. No.: 428,058

[22] Filed: Apr. 25, 1995

Related U.S. Application Data

[63] Continuation-in-part of Ser. No. 82,166, Jun. 28, 1993, abandoned, which is a continuation of Ser. No. 580,541, Sep. 11, 1990, abandoned.

[30]   Foreign Application Priority Data

Sep. 12, 1989 [JP] Japan ................................. 1-235980

[51] Int. Cl.$^6$ ........................................ G06F 13/00
[52] U.S. Cl. ........................................ 395/500
[58] Field of Search .................. 395/200.01, 200.13, 395/500, 831, 284, 285, 650

[56]   References Cited

U.S. PATENT DOCUMENTS

| | | | |
|---|---|---|---|
| 4,831,620 | 5/1989 | Conway et al. | 370/85 |
| 4,991,133 | 2/1991 | Davis et al. | 364/DIG. 2 |
| 5,007,051 | 4/1991 | Dolkas et al. | 370/85.1 |
| 5,007,080 | 4/1991 | MacMillan et al. | 379/269 |
| 5,012,470 | 4/1991 | Shobu et al. | 370/110.1 |
| 5,113,398 | 5/1992 | Howes | 371/11.2 |
| 5,184,348 | 2/1993 | Abdelmoutalido et al. | 370/95.1 |
| 5,208,811 | 5/1993 | Kashio et al. | 370/94.1 |
| 5,214,646 | 5/1993 | Yacoby | 370/85.14 |

*Primary Examiner*—Thomas M. Heckler
*Attorney, Agent, or Firm*—Foley & Lardner

[57]   ABSTRACT

A computer system for an open systems interconnection (OSI) management system capable of handling non-open systems as managed objects of the OSI management system. The system comprises an open system agent which intervenes between an open system manager and the non-open systems. The open system agent has a non-open system-communication unit for communicating with the non-open systems, a manager-communication unit for communicating with the open system manager, an information converting unit for converting the non-open system information format using information provided by the non-open system-communication unit and for converting the OSI management information format using information provided by the manager-communication unit. Finally, the open system agent has a managing unit for performing processing so as to make the non-open systems appear as if they were operating as systems managed in accordance with OSI management protocols by using the information converting unit, the non-open system-communication unit and the manager communication unit.

22 Claims, 19 Drawing Sheets

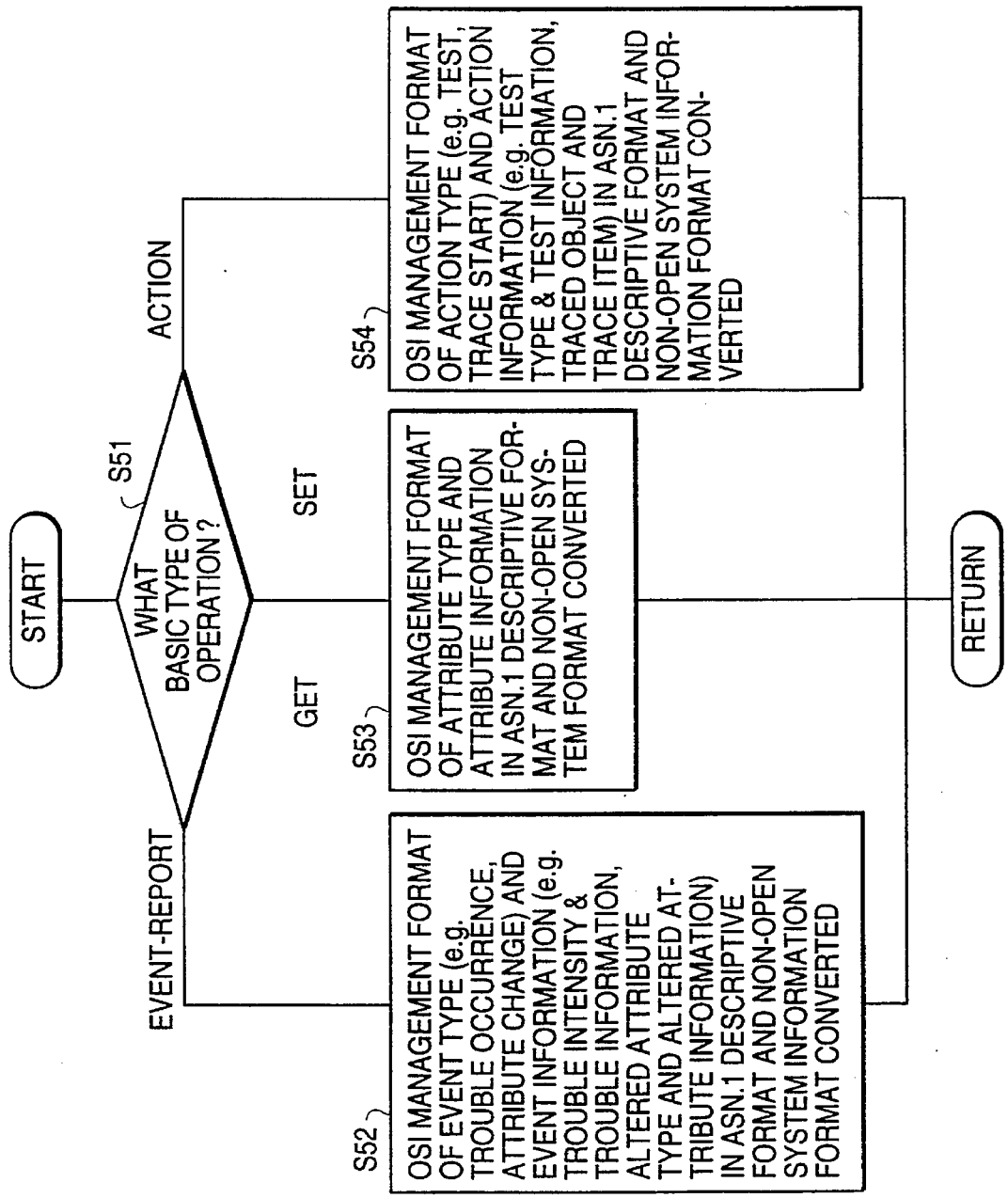

FIG. 11

```
spnModem   MANAGED OBJECT CLASS
      DERIVED FROM top;
           CHARACTERIZED BY spnModemPackage  PACKAGE
              BEHAVIOR spnModemBehavior;
              ATTRIBUTES
                    portNo                    GET,
                    operationalState          GET;
              NOTIFICATIONS
                    stateChange ;;;
REGISTERED AS   {zzzMObjectClass 1};

spnModemBehavior BEHAVIOR
     DEFINED AS "This CLASS expresses SPN modem, which can collect
the control message from the control port, and is identified in accordance
with "portNo", which is the number of the control port.
     According to operationalState ATTRIBUTE, the state of the
modem is expressed as follows:
                    modem status   |   operationalState
                    ---------------------------------------
                    ACTIVE         :   enable
                    INACTIVE       :   disable
     If the state changes,  stateChange NOTIFICATION is notified to
the Manager by the Agent.";

portNo ATTRIBUTE
     WITH ATTRIBUTE SYNTAX PortNo
     MATCHES FOR EQUALITY;
REGISTERED AS  ( zzzAttributeID  1 );

PortNo ::= INTEGER
```

FIG. 12 pbx MANAGED OBJECT CLASS
    DERIVED FROM top;
        CHARACTERIZED BY pbxPackage PACKAGE
      BEHAVIOR pbxBehavior;
      ATTRIBUTES
          dtaAddress               GET,
          operationalState         GET;
      NOTIFICATIONS
          stateChange ; ; ;
REGISTERED AS {xxxMObjectClass 2};

pbxBehavior BEHAVIOR

DEFINED AS "This CLASS expresses PBX, which can collect the control message from the network, and is identified in accordance with the number of the specific DTE.
    According to the operationalState ATTRIBUTE, the state of the PBX is expressed as follows:

PBX status    | operationalState
        ------------------------------------------
        ACTIVE        : enable
        INACTIVE    : disable If the state changes, stateChange NOTIFICATION is notified to the Manager by the Agent.";

dteAddress ATTRIBUTE
    WITH ATTRIBUTE SYNTAX DTEaddress
    MATCHES FOR EQUALITY;
REGISTERED AS {xxxAttributeID 2 };

DTEaddress : : = OCTET STRING

FIG. 13 agent MANAGED OBJECT CLASS
    DERIVED FROM top;
        CHARACTERIZED BY agentPackage PACKAGE
        BEHAVIOR agentBehavior;
        ATTRIBUTES
            agentId          GET; ; ;
REGISTERED AS {zzzMObjectClass 3} ;

agentBehavior BEHAVIOR
    This CLASS is defined virtually for integrating apparatuses of the network.

agentId ATTRIBUTE
    WITH ATTRIBUTE SYNTAX AgentId
    MATCHES FOR EQUALITY ;
REGISTERED AS { zzzAttributeID 3};

AgentId ; ; = IA5String

FIG. 14

```
top   MANAGED OBJECT CLASS
            CHARACTERIZED BY topPackage  PACKAGE
            BEHAVIOR topBehavior ;
            ATTRIBUTES
                  objectClass              GET ,
                  nameBinding              GET ; ; ;
            CONDITIONAL PACKAGES
                  ∫
REGISTERED AS   {smi2MObjectClass 14} ;
``` topBehavior BEHAVIOR

DEFINED AS "This is the top level of managed object class hierarchy and every other managed object class is a specialization of either this generic class (top) or a specialization of subclass of top" ;

objectClass ATTRIBUTE
       WITH ATTRIBUTE SYNTAX  Attribute-ASN1Module , ObjectClass ;
       MATCHES FOR EQUALITY ;
REGISTERED AS  {smi2AttributeID 65} ;

nameBinding ATTRIBUTE
       WITH ATTRIBUTE SYNTAX  Attribute-ASN1Module . NameBinding ;
       MATCHES FOR EQUALITY ;
REGISTERED AS  {smi2AttributeID 63} ;

operationalState ATTRIBUTE
       WITH ATTRIBUTE SYNTAX  Attribute-ASN1Module . OperationalState ;
       MATCHES FOR EQUALITY ;
REGISTERED AS  {smi2AttributeID 35} ;

stateChange NOTIFICATION
       BEHAVIOR stateChangeBehavior ;
       WITH INFORMATION SYNTAX Notification -
       ASN1Module.StateChangeInfo
REGISTERED AS  {smi2Notification 14} ;

stateChangeBehavior  BEHAVIOR

DEFINED AS "This notification type is used to report the change in the value of one or more state attributes of a managed object that result through either internal operation of the managed object or via management operation." ;

FIG. 15

Attribute-ASN1Module { joint - iso - ccitt ms ( 9 ) smi ( 3 ) part2 ( 2 ) asn1Module (2) 1 }
DEFINITIONS IMPLICIT IAGS : : =

BEGIN

IMPORTS ObjectClass,
    FROM CMIP-1 { joint - iso - ccitt ms ( 9 ) cmip ( 1 ) module ( 0 ) protocol ( 3 ) }
∫

NameBinding : : = OBJECT IDENTIFIER

OperationalState : : = ENUMERATED { disabled ( 0 ) , enabled ( 1 ) }

END

Notification - ASN1Module { joint - iso - ccitt ms ( 9 ) smi ( 3 ) part2 ( 2 ) asn1Module (2) 2 }
DEFINITIONS IMPLICIT IAGS : : =

BEGIN

IMPORTS
∫

StateChangeInfo : : = SEQUENCE {
    sourceIndicator    SourceIndicator OPTIONAL ,
    attributeIndentifierList    (1) AttributeIndentifierList
OPTIONAL ,
    stateChangeDefinition    StateChangeDefinition ,
    notificationIdentifier    NotificationIdentifier OPTIONAL ,
    correlatedNotifications    (2)CorrelatedNotifications
OPTIONAL ,
    additionalText    AdditionalText OPTIONAL ,
    additionalInformation    (3)AdditionalInformation OPTIONAL }

END

FIG. 16

CMIP-1 { joint - iso - ccitt ms ( 9 ) cmip ( 1 ) modules ( 0 ) protocol ( 3 ) }
DEFINITIONS : : = BEGIN IMPORTS
DistinguishedName , RDNSequence FROM InformationFramework
{ joint - iso - ccitt ds ( 5 ) modules ( 1 ) informationFramework ( 1 ) }
∫ m- Action - Confirmed OPERATION
    ARGUMENT   ActionArgument
    RESULT      ActionResult
    ∫
    : : = localValue 7 m- EventReport OPERATION
    ARGUMENT   EventReportArgument
    : : = localValue 0 m- Get OPERATION
    ARGUMENT   GetArgument
    RESULT      GetResult
    ∫
    : : = localValue 3 m- Set - Confirmed OPERATION
    ARGUMENT   SetArgument
    RESULT      SetResult
    ∫
    : : = localValue 5

ActionArgument : : = ' ∫

ActionResult : : = ∫

Attribute : : = SEQUENCE {
    attributeId     AttributeId,
    attributeValue  ANY DEFINED BY attributeId }

AttributeID : : = CHOICE {
    globalForm  [0] IMPLICIT OBJECT IDENTIFIER
    localForm   [1] IMPLICIT INTEGER }

FIG. 17

```
BaseManagedObjectId : : = SEQUENCE {
    baseManagedObjectClass          ObjectClass ,
    baseManagedObjectInstance       ObjectInstance }

EventReportArgument : : = SEQUENCE {
    managedObjectClass              ObjectClass ,
    managedObjectInstance           ObjectInstance ,
    eventTime                       [5] IMPLICIT GeneralizedTime
OPTIONAL ,
    eventType                       EventTypeId,
    eventInfo                       [a] ANY DEFINED BY eventType
OPTIONAL}

EventTypeId : : = Choice {
    globalForm          [0]         IMPLICIT OBJECT IDENTIFIER,
    localForm           [1]         IMPLICIT INTEGER }

GetArgument : : = SEQUENCE {
    COMPONENTS OF BaseManagedObjectId,
    accessControl                   [5] AccessControl OPTIONAL,
    synchronization                 [5] IMPLICIT CMISSync DEFAULT
bestEffort ,
    scope                           [7] Scope DEFAULT baseObject ,
    filter                          CMIPFilter DEFAULT and { } ,
    attributeIdList                 [12] IMPLICIT SET Of AttributeId
OPTIONAL }

GetResult : : = SEQUENCE {
    managedObjectClass              ObjectClass,
    managedObjectInstance           ObjectInstance,
    currentTime                     [5] IMPLICIT GeneralizedTime
OPTIONAL,
    attributeList                   [6] IMPLICIT SET OF Attribute
OPTIONAL }

ObjectClass : : = Choice {
    globalForm [0] IMPLICIT OBJECT IDENTIFIER ,
    localForm [1] IMPLICIT INTEGER }

ObjectInstance : : = Choice {
    distinguishedName               [2] IMPLICIT DistinguishedName ,
    nonSpecificForm                 [3] IMPLICIT OCTET STRING ,
    localDistinguishedName          [4] IMPLICIT RDNSequence }

END
```

FIG. 18(a)

| DNID | SNID | CLSID | AGTID | DELFLAG | DNLAST | DNLEN | DN |
|---|---|---|---|---|---|---|---|

FIG. 18(b)

| DNID | ATTRID | DELFLC | ATTIB | ATTRLEN |
|---|---|---|---|---|

FIG. 18(c)

| DN | DNID |
|---|---|

FIG. 18(d)

| AGTID | accessADDRESS |
|---|---|

FIG. 18(e)

| ObjectClass (globalform) | CLSID |
|---|---|

FIG. 18(f)

| AttributeId (globalform) | ATTRID |
|---|---|

COMPUTER SYSTEM HAVING AN OPEN SYSTEMS INTERCONNECTION (OSI) MANAGEMENT SYSTEM FOR AN INFORMATION CONVERSION FOR MANAGEMENT OF NON-OPEN SYSTEMS

This application is a continuation-in-part of application Ser. No. 08/082,166 filed Jun. 28, 1993, abandoned; which is a continuation of application Ser. No. 07/580,541 filed Sep. 11, 1990, now abandoned.

BACKGROUND OF THE INVENTION

The present invention relates to a computer system having an Open Systems Interconnection (OSI) management facility capable of handling non-open systems as managed objects of the OSI model as described in the International Organization for Standardization, 7498-4 "Management Framework."

Conventionally, the managed objects of the OSI management system described in the International Organization for Standardization, 7498-4 "Management Framework" should be open systems capable of "autonomous management" and "co-operation with other open systems . . . to perform and coordinate management activities". For this reason, non-open systems, such as MODEM's and Private Branch Exchanges (PBX's), which do not have the seven-layers of the OSI model and cannot execute OSI management protocols, are not objects of OSI management. Consequently, it is difficult to build a comprehensive OSI management system capable of managing such non-open systems.

Modifying a non-open system, such as a MODEM, so as to enable it to execute the first through seventh-layer of OSI protocols would be extremely difficult, because the OSI protocols for systems such as a MODEM, would require the MODEM to have a greater number of functions and responsibilities than conventional MODEMs typically have.

An object of the present invention is to provide a computer system for implementing an OSI management system to permit the incorporation of non-open systems under the OSI model without requiring the modification of the non-open systems.

SUMMARY OF THE INVENTION

The OSI model provides common protocols to management networks which have different communication system implementations. By using the OSI protocols, communication system users are able to use communication systems provided by different vendors. Moreover, Open Communication System vendors are able to compete with each other on the standard protocols. These protocols, however, are difficult to implement because the protocols use the first through seventh layer protocols of the OSI model, shown in FIG. 2, and are only defined abstractly. A key feature of the instant invention is the provision of a system capable of managing non-open systems, such as Modems or PBXs, with the common OSI protocols.

The protocol format for one type of network equipment is different from the protocol format for other types of network equipment. The application programs for managing a network must be developed for each network protocol, making the development of the application programs difficult. In particular, in a multi-vendor environment, the development of application programs is very difficult because the network protocol specifications are often not clear.

International standards, such as the ISO/IEC 7498-4 standard (incorporated herein by reference), have been defined to provide a standard protocol. Adhering to the above international standard has the following advantages:

1) The protocol format is unified by the ISO/IEC 9596-1 (incorporated herein by reference), and the host computer does not need to support different types of protocols for network management.
2) A management application program can be developed regardless of the type of equipment to be managed.
3) A management system can be developed regardless of the communication medium to be used.

This type of management network, however, has the following major disadvantages.

1) The parameters related to the standard format are abstract and detailed information related to the equipment cannot be checked and is often not available.
2) The main feature of the ISO/IEC 9596-1 protocol is the definition of the manner in which managed equipment detect and report events to the managing equipment. It is difficult and impractical to realize the detection and reporting of events on a Modem.

In order to overcome these disadvantages, the present invention employs OSI management information (such as "distinguished names") used in the OSI model, other than "network addresses" as used in the SNMP (Single Network Management Protocol) of the Internet. By using the, for example, "Distinguished Names" as OSI management information, the present invention succeeds in binding modems and PBXs into bundles as shown in FIG. 3. Furthermore the instant invention emulates the MIB (Management Information Base) which is a virtual database of OSI management protocols. In this manner, the present invention succeeds in supporting OSI protocol primitives such as the m-Get (reference) or m-Set (modification) protocols.

For a storable communication system, such as a PBX, the Open System Agent is provided for accessing the communication system as soon as the Open System Agent receives a request from an Open System Manager. On the other hand, for un-storable communications systems, such as a modem, the Open System Agent regularly polls the communication system to collect the status of the communication system and supplies the collected status to the Open System Manager. Thus, the instant invention has the advantage that non-open systems can be handled with the OSI protocols even when there is no complete OSI protocol implementation.

According to one aspect of the invention, a system comprised of non-open systems which are the managed objects, an Open System Manager functioning as the OSI management center, and an Open System Agent intervening between the Open System Manager and the non-open systems, wherein said Open System Agent further comprises:

non-open system-communication means for communicating with said non-open system, manager-communication means for communicating with said Open System Manager in accordance with the OSI management protocols, information converting means for converting the non-open system information format information provided by said non-open system-communication means and the OSI management information format of information provided by said manager-communication means, and managing means for performing such processing as to make said non-open systems appear as if they were operating as systems managed in accordance with the OSI management protocols by using the information converting means, said non-open system-communication means and said manager-communication means.

BRIEF DESCRIPTION OF THE DRAWINGS

FIG. 10 illustrates an example of processing by the information converting means 3 shown in FIG. 2.

FIG. 11 illustrates an spnModem CLASS definition.

FIG. 12 illustrates a PBX CLASS definition.

FIG. 13 illustrates an agent CLASS definition.

FIG. 14–15 illustrate an SMI2 definition.

FIG. 16–17 illustrate a CMIP definition.

FIGS. 18(a)–(f) illustrate the record format of the management table.

LIST OF TABLES

TABLE 1 shows Management Records for Distinguished Names.

TABLE 2 show Management Records for Attributes.

TABLE 3 shows Management Records for Distinguished Names IDs.

TABLE 4 shows Management Records for Access Addresses.

TABLE 5 shows Management Records for Object Classes.

TABLE 6 shows Management Records for Attribute IDs.

DETAILED DESCRIPTION OF THE PREFERRED EMBODIMENTS

The instant invention is directed to an interconnection between an OSI Open System Manager and non-open system devices. In reference to FIG. 1, an Open System Agent 10 is provided between an OSI Open System Manager 20 and non-open system devices 30-1 through 30-n in order to make the non-open system devices appear as open system devices to the OSI Open System Manager 20. A unique advantage of the instant invention, is that the Open System Agent 10 may be used in conjunction with a plurality of non-open system devices 30-1 through 30-n which have different information formats. For example, both a PBX and a MODEM may be connected to the OSI Open System Manager 20 via the Open System Agent 10. The Open System Agent 10 may comprise a computer such as a NEC EWS4800 series, and the managing means 2 and information converting means 3 may be implemented by programming the digital computer to perform the various functions described herein. Further, both the manager communication means 4 and the non-open system communication means are implemented by programming the Agent 10 computer to performing communication functions (OSI, TCP/IP, RS232C, etc.) supplied by the operating system.

The non-open systems devices 30-1 through 30-n are the managed objects. The Open System Manager 20 functions as the OSI management center system, and the Open System Agent 10 performs such processing as to make the non-open system devices 30-1–30-n appear to the Open System Manager 20 as if they were operating as systems managed in accordance with the OSI management protocols. As a result, the non-open systems 30-1 to 30-n, as viewed from the Open System Manager 20 through the Open System Agent 10, appear as if they were open systems capable of "autonomous management" and "co-operation with other open systems . . . to perform and coordinate management activities".

Figure 1:
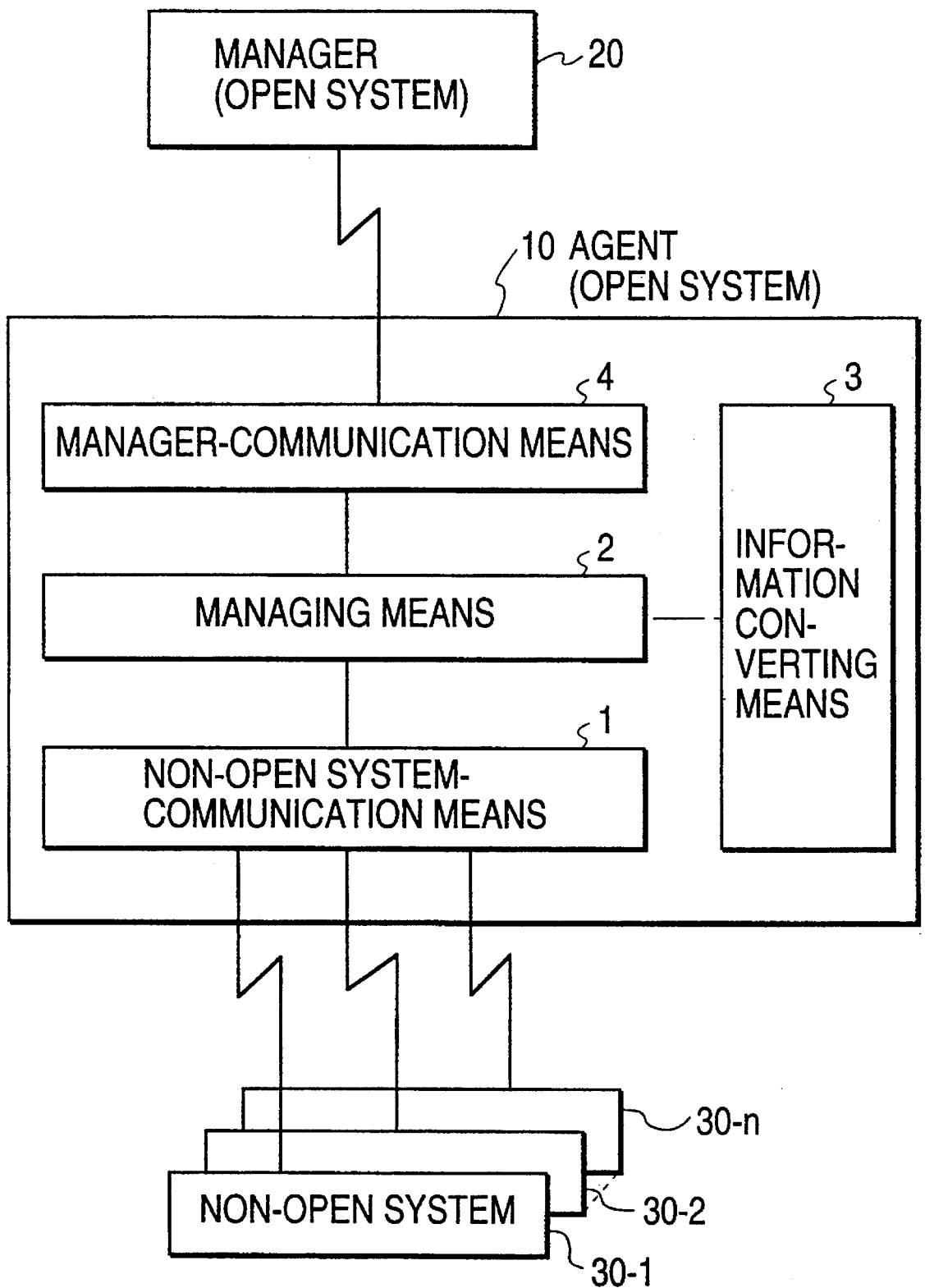
FIG. 1 illustrates the configuration of a preferred embodiment of the present invention.

The Open System Agent 10 of FIG. 1 and the Open System Manager 20 operate on an application program which supports the seventh layer of the OSI protocol. The OSI management protocol sequence is converted in response to a command from the Open System Manager 20. The Open System Manager 20 normally can only communicate with open systems which are operating in an information format compatible with that of the Open System Manager 20. Therefore, in order to enable the Open System Manager 20 to manage non-open system devices 30 as management objects, it is necessary to present information from these non-open systems to the Open System Manager 20 as if the information came from open systems, as well as supplying information to the non-open systems in a compatible format rather than in the open system format.

Thus, the Open System Agent 10 is coupled between the Open System Manager 20 and the non-open systems 30. The Open System Agent 10 includes manager communication means 4 for communicating with the Open System Manager 20, non-open systems communications means 1 for communicating with non-open systems 30, information converting means 3 in order to appropriately convert open systems and non-open systems information which are input thereto, and managing means 2 which manages or controls the manager-communication, non-open system communication, and information converting means 3 of the Open System Agent 10.

The non-open system-communication means 1 communicates with communication means which can be provided by the non-open systems 30-1 through 30-n. The non-open system-communication means may connect with, for example, an RS-232C interface, a high level data link control (HDLC) interface or an X.25 interface.

The manager-communication means 4 communicates with the Open System Manager 20 in accordance with OSI management protocols. The managing means needs to manage events with the OSI protocol. The managed equipment needs to manage events with the original non-open systems protocol.

The main feature of the Open System Agent 10 lies in having the following functions.

The OSI is designed to provide a common management information protocol as a unifying protocol format as defined in the ISO/IEC 9596-1. The conversion between the unifying protocol format and the original protocol format takes place in the information converting means 3.

The common management information protocol format further has the feature that a request may be issued from the managed system to the managing system, that is, one the managed system may independently issue a notification request by the m-Event Report and m-Event Report-Confirmed request.

Figure 5:
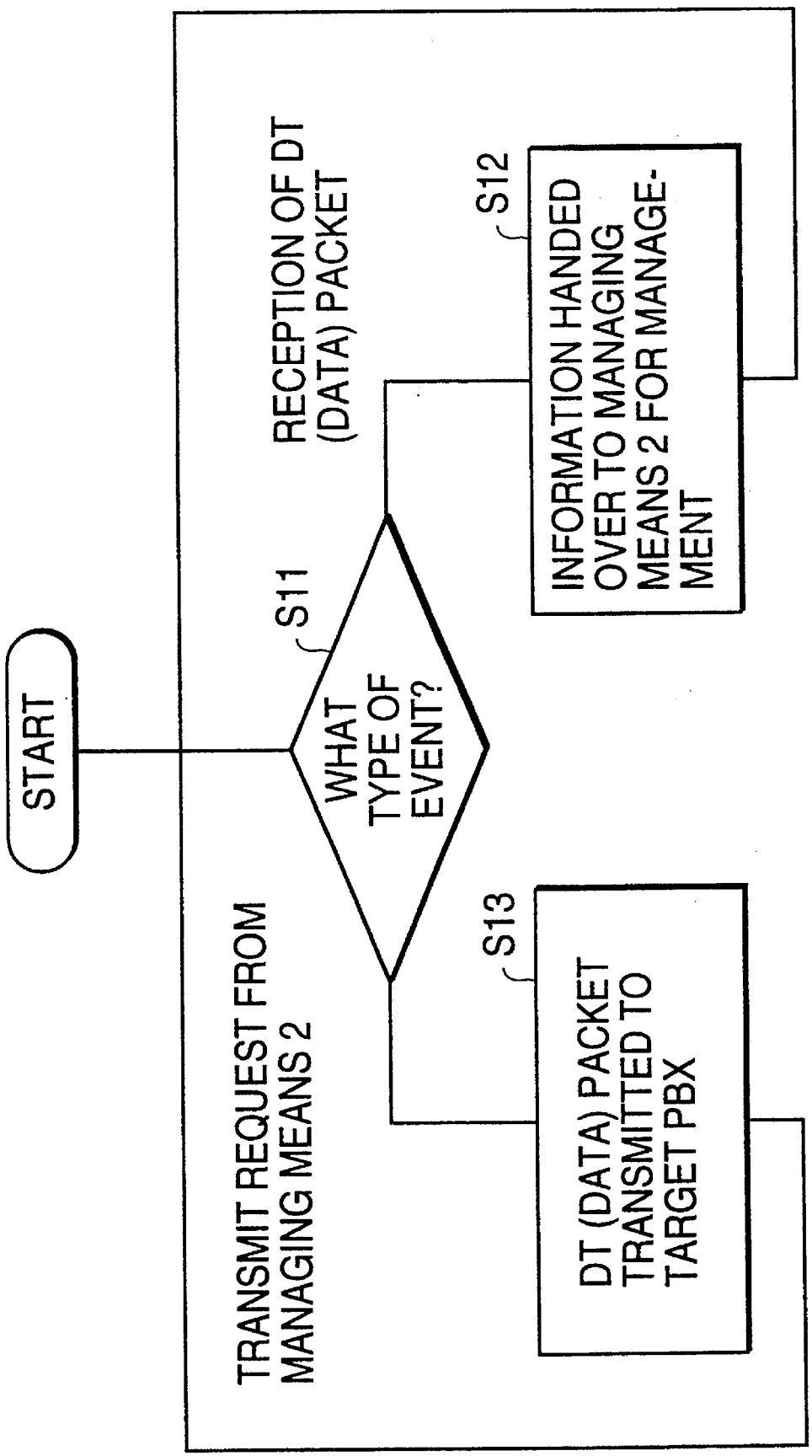
FIG. 5 illustrates an example of processing by the non-open system-communication means 1 shown in FIG. 1 where the non-open systems are PBX's.

The non-open system communication means detects the occurrence of an event in accordance with the informing capability of the non-open system. For example, step S12 in FIG. 5 shows a PABX (one example of the non-open system with informing ability) transmitting information to managing means 2.

Figure 4:
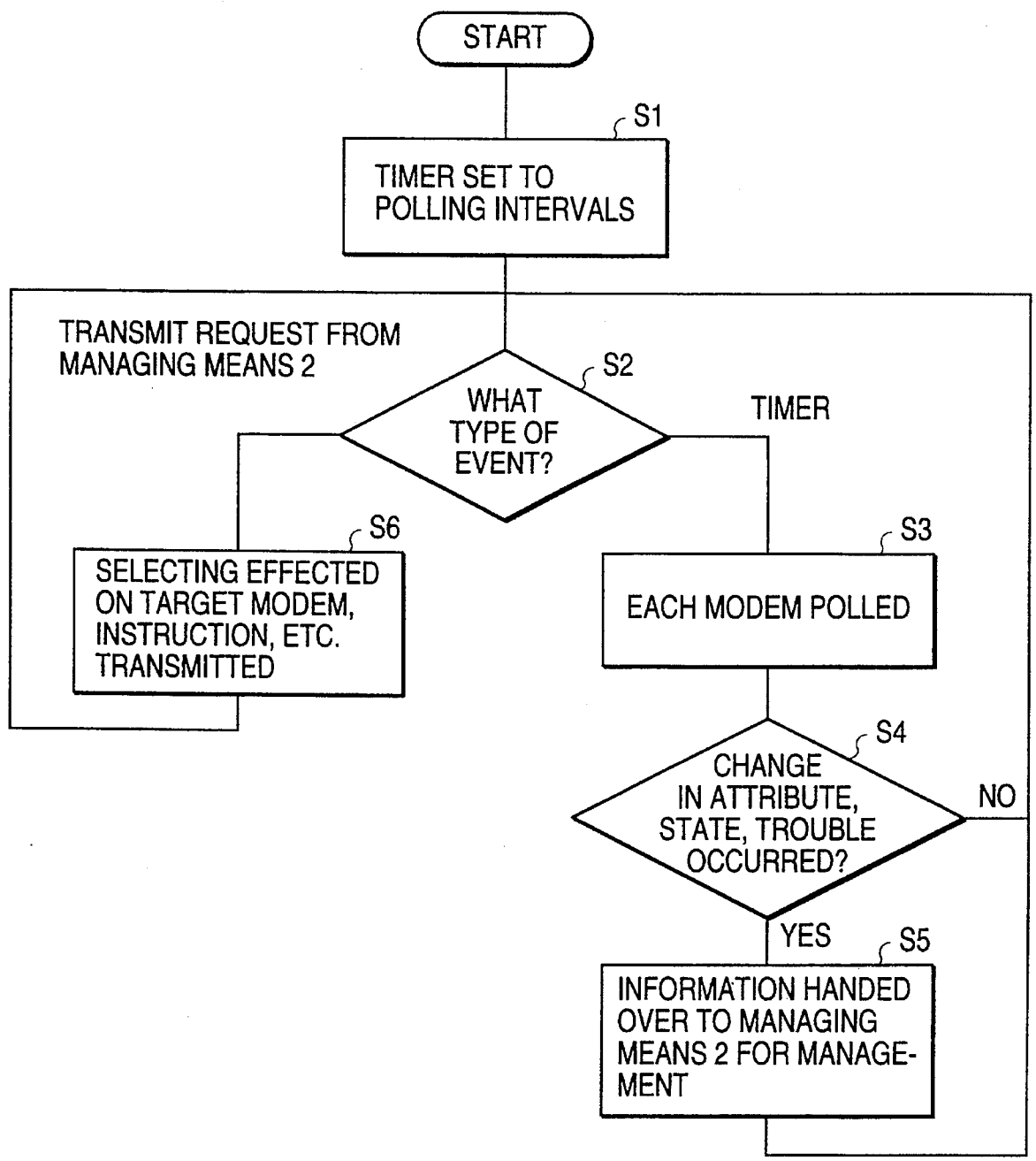
FIG. 4 illustrates an example of processing by the non-open system-communication means 1 shown in FIG. 1 where the non-open systems are MODEM's.

Referring to FIG. 4 for another example, a MODEM (an example of a non-open system with no informing ability) sets a timer to polling intervals (S1), polls each modem (S2), checks the change in attribute, state, and trouble status (S4), and transmits the information to managing means 2.

Figure 6:
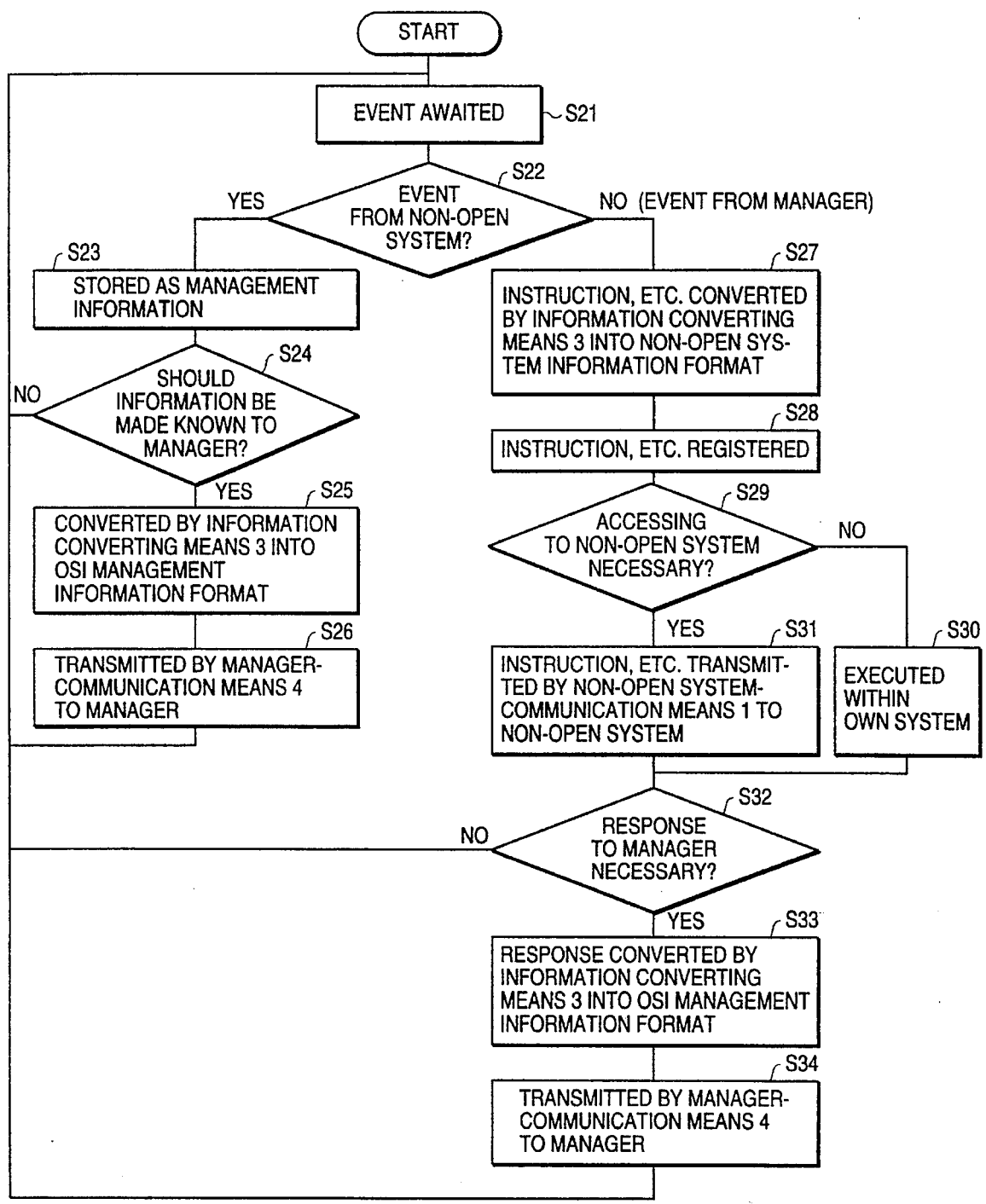
FIG. 6 illustrates an example of processing by the managing means shown in FIG. 1.

In reference to FIG. 6, the managing means 2 stores the information provided from the non-open system communication means 1 (S23), judges whether or not the detailed information should be conveyed to the Open System Manager 20 (S24), converts the information into the appropriate protocol format, and transmits the converted information to the manager-communication means 4 (S26). The present invention provides a technique for realizing the independent informing behavior under control of the protocol defined by ISO/IEC 9596-1 for keeping the unification interoperability of the Open System Manager which handles the non-open system as an open system.

Figure 2:
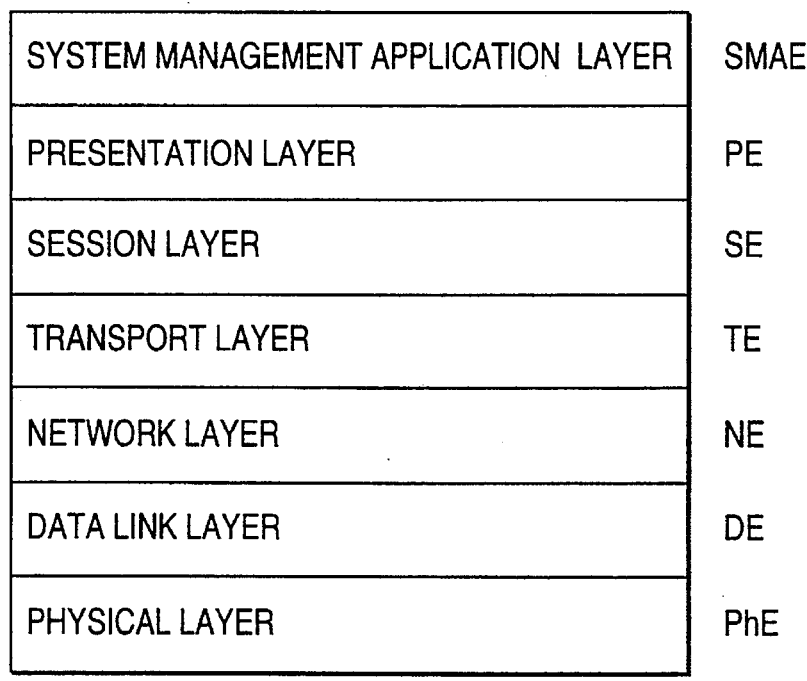
FIG. 2 illustrates the seven OSI layers for realizing the manager-communication means 4 shown in FIG. 1.

The seven layers for implementing the OSI management protocols, shown in FIG. 2, comprise, in ascending layer order, a physical layer PhE, a data link layer DE, a network layer NE, a transport layer TE, a session layer SE, a presentation layer PE and a system management application layer SMAE.

The managing means 2 comprises the following steps S22, S24, S29 and S32 as shown in FIG. 6. The following operations occur during steps S22, S24, S29, and S32.

Step S22; determine if the source system sending the event is a non-open system or an open system.

Step S24; do not convey the information which is internally managed by the resource.

Step S29; in the case that the inquiry from the Open System Manager for information to be received from the real resource in real time, ask for the information from the real non-open system resource.

Step S32; in ISO/IEC 9596-1, OSI management protocol specification, there are confirmation (requiring a response) type operations and non-confirmation (not requiring a response) type operations in the action operations, event reporting operations, and set operations. The confirmation type operations, like the action operations and the set operations, are needed for the Open System Agent 16 to send back a response to the Open System Manager 20.

The managing means 2 performs such processing as is necessary to make the non-open systems appear to the Open System Manager 20 as if they were operating as a system managed in accordance with the OSI management protocols by using the information converting means 3, the non-open system-communication means 1 and the manager-communication means 4. More specifically, the managing means 2 internally stores as management information the information collected by the non-open system-communication means 1 from the non-open systems 30-1 to 30-n. At the same time, if the information is to be conveyed to the Open System Manager 20, the managing means 2 converts it into the OSI management information format and sends it to the Open System Manager 20 through the manager-communication means 4. The managing means 2 analyzes information (instructions or data) received by the manager-communication means 4 from the Open System Manager 20 or a local system and, if necessary, causes it to be converted by the information converting means 3 into the non-open system information format to be sent to the non-open systems 30-1 to 30-n through the non-open system-communication means 1.

The information as to whether the Non-Open system 30-1 through 30-n is a MODEM 31 type or a PBX 32 type is stored in the information converting means 3. The managing means 2 recognizes these two types as shown at S29 in the flow chart of FIG. 6.

In the case of a MODEM 31 type of non-open system, the non-open system communication means 1 executes the processes shown in the flow charts of FIG. 4. That is, because the non-open system itself cannot store the management information, the Open System Agent 10 has to store the management information.

In the case of the PBX 32 type of non-open system, the non-open system communication means 1 executes the processes shown in the flow charts of FIG. 5. That is, because the non-open system can store the management information, the Open System Agent 10 requests the supply of the information from the non-open system in response to the request from the Open System Manager 20.

In the preferred embodiment illustrated in FIG. 1, a plurality of non-open systems 30-1 through 30-n are connected to a single manager system 20 via a single Open System Agent 10.

Figure 3:
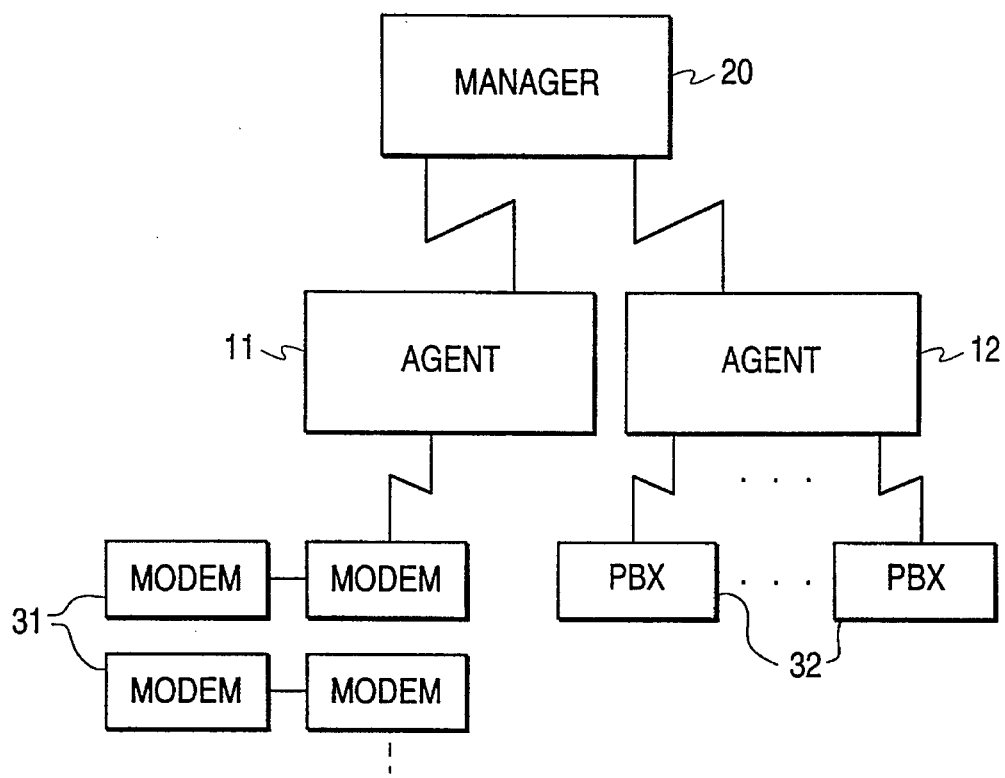
FIG. 3 illustrates another system configuration to which the preferred embodiment of the invention is applicable.

Referring to FIG. 3, in another system configuration to which the preferred embodiment is applied, a plurality of Open System Agents 11 and 12, each having the same arrangement as the Open System Agent 10 shown in FIG. 1, are connected to a single Open System Manager 20, so that non-open systems of different types and from different manufacturers can be connected to the Open System Agents 11 and 12. The alternative system configuration, shown in FIG. 3, is an instance in which a plurality of MODEM's 31 are connected to the open system agent 11 as non-open systems, while a plurality of PBX's are connected to the open system agent 12 as non-open systems.

By providing the non-open system communication means 1 in each non-open system device in order to limit the non-open system 30-n as the MODEM 31 type or PBX 32 type, the Managing means 2 can execute processes shown in the flow charts of FIG. 6, and does not depend on the type of on-open system device.

Next will be described examples of processing performed by the non-open system-communication means 1, managing means 2, information converting means 3 and manager-communication means 4 shown in FIG. 1.

An example of processing by the non-open system-communication means 1 will be described first with reference to FIG. 4.

Where the non-open systems are MODEM's, the non-open system-communication means 1 can be so structured as to poll an RS-232C interface without handshaking procedures and, every time it does so, collect information or distribute information.

The non-open system communication means read/write the management information to the RS-232C port of the secondary channel which is supplied from the modem. The management information of the modems is collected from the RS-232C port. (See, for example, FIG. 21).

FIG. 4 is a flow chart showing an example of processing by the non-open system-communication means 1 having such a configuration.

An internal timer is initially set to the polling intervals (S1), the occurrence of an event is awaited after that and, as one occurs, its type is determined (S2). If the event that has occurred is judged to be attributable to the timer, each MODEM within the system is polled (S3) and, if the information collected is judged to concern a change in an attribute/state or a trouble occurrence (YES at S4), the information is transmitted to the managing means 2 (S5), and the process returns to step S2 to await the occurrence of the next event. If the judgment is NO at step S4, i.e. if the collected information is judged not to concern a change in an attribute/state or a trouble occurrence, the process returns to step S2. On the other hand, if the event that has occurred is judged at step S2 to be attributable to a transmit request from the managing means 2, selection of the MODEM designated by the transmit request is performed, and an instruction or the like provided from the managing means 2 is transmitted (S6) to the designated (target) MODEM, followed by a return to step S2.

When the non-open systems are PBX's, the non-open system-communication means 1 can be structured to have packets loaded with management information or instructions transmitted and received by an X.25 interface.

FIG. 5 shows an example of processing by the non-open system-communication means 1, wherein the non-open system is a PBX. At step S11, the occurrence of an event is awaited and, as one occurs, its type is determined. If the event that has occurred is judged to be attributable to the receipt of a data (DT) packet from a PBX, the information received with the packet is transmitted to the managing means 2 (S12), and the process returns to step S11. If the event that has occurred is judged at step S11 to be attributable to a transmit request from the managing means 2, a data (DT) packet containing an instruction or the like provided from the management means 2 is transmitted to the PBX designated by the transmit request (S13), followed by a return to step S11.

An example of processing by the managing means 2, which is one of the characteristic features of this preferred embodiment, is not described in reference to FIG. 6.

Referring to FIG. 6, the managing means 2, after being started up, awaits for the occurrence of an event at step S21. In response to the occurrence of an event, it is determined at step S22 whether the event is one conveyed from a non-open system through the non-open system-communication means 1 by the processing at step S5 of FIG. 4 or at step S12 of FIG. 5 or is one conveyed from the Open System Manager 20 through the manager-communication means 4 by the processing at step S44 of FIG. 7. If it is judged to be an event from a non-open system, information concerning changes in the attribute/state of the non-open system or trouble occurrence is internally stored at step S23. At step S24 it is determined whether or not the current information should be conveyed to the management system 20. If this processing at step S24 results in a decision that the information need not be conveyed to the Open System Manager 20, the occurrence of another event is awaited at step S21. If the information is judged at step 24 to require conveyance to the Open System Manager 20, it is converted by the information converting means 3 into the OSI management information format (S25), and the converted information is transmitted by the manager-communication means 4 to the Open System Manager 20 (S26), followed by waiting for the occurrence of another event at S21.

On the other hand, if the event having undergone a decision at S22 has come from the Open System Manager 20, the instruction or the like from the Open System Manager 20 is converted by the information converting means 3 into the non-open system information format (S27) and internally stored or registered (S28). Then, it is judged whether the processing of the current instruction or the like requires accessing to a non-open system (S29) and, if it does, the current instruction or the like is transmitted by the non-open system-communication means 2 to the non-open system (S31). If, at step S29, the need for accessing any non-open system is judged to be absent, i.e., processing is possible with reference to management information stored in the managing means 2, the execution will take place within this system (S30). Then, it is judged whether or not the response to the current instruction or the like should be returned to the Open System Manager 20 (S32) and, if it need not be, the occurrence of the next event is awaited at step S21. If the return is judged to be necessary at step S32, the response is converted by the information converting means 3 into the OSI management information format (S33), and transmitted by the manager-communication means 4 to the Open System Manager 20 (S34), followed by waiting for the occurrence of another event at step S21.

Next will be described in detail an example of processing by the manager-communication means 4 with reference to FIG. 7. The manager-communication means 4 performs the basic operations of OSI management protocols including event reporting (EVENT-REPORT), information getting (GET), information setting (SET) and action on object (ACTION) between the Open System Agents 11 and 12 (or the Open System Agent 10) on the one hand and the Open System Manager 20 on the other. Requests for information getting (GET), information setting (SET) and action on object (ACTION) flow mainly from the Open System Manager to an Open System Agent, and response, if any, to the requests flow in the reverse direction. Event reporting (EVENT-REPORT) flows from an Open System Agent to the Open System Manager, and responses thereto, the other way around.

Figure 7:
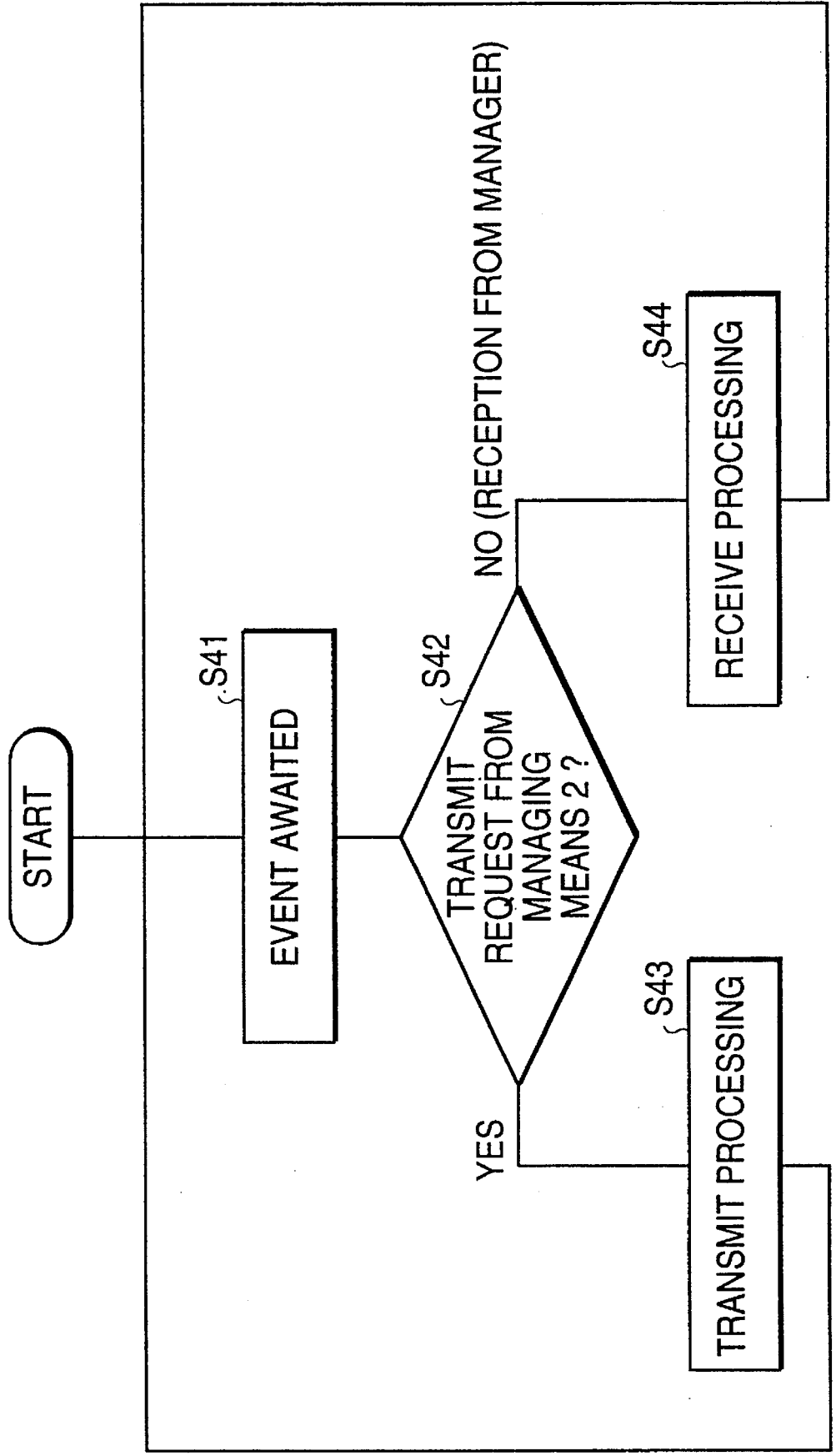
FIG. 7 illustrates an example of processing by the manager-communication means 4 shown in FIG. 1.

The flow chart for the manager communication means 4 is shown in FIG. 7. Furthermore, with regard to FIG. 7 the flow chart for step 43 is shown in FIG. 8 and the flow chart for step 44 is shown in FIG. 9.

FIG. 7 outlines an example of such processing by the manager-communication means 4. After being started up, the manager-communication means 4 awaits the occurrence of an event at step S41 and, in response to the occurrence of an event, determines whether it concerns a transmit request from the managing means 2 or reception from the Open System Manager 20 (S42). If the event is determined at step S42 to be one concerning a transmit request from the managing means 2, transmit processing takes place at step S43. If it is judged at step S42 to be one concerning reception from the Open System Manager 20, reception processing is performed at step S44.

Figure 8:
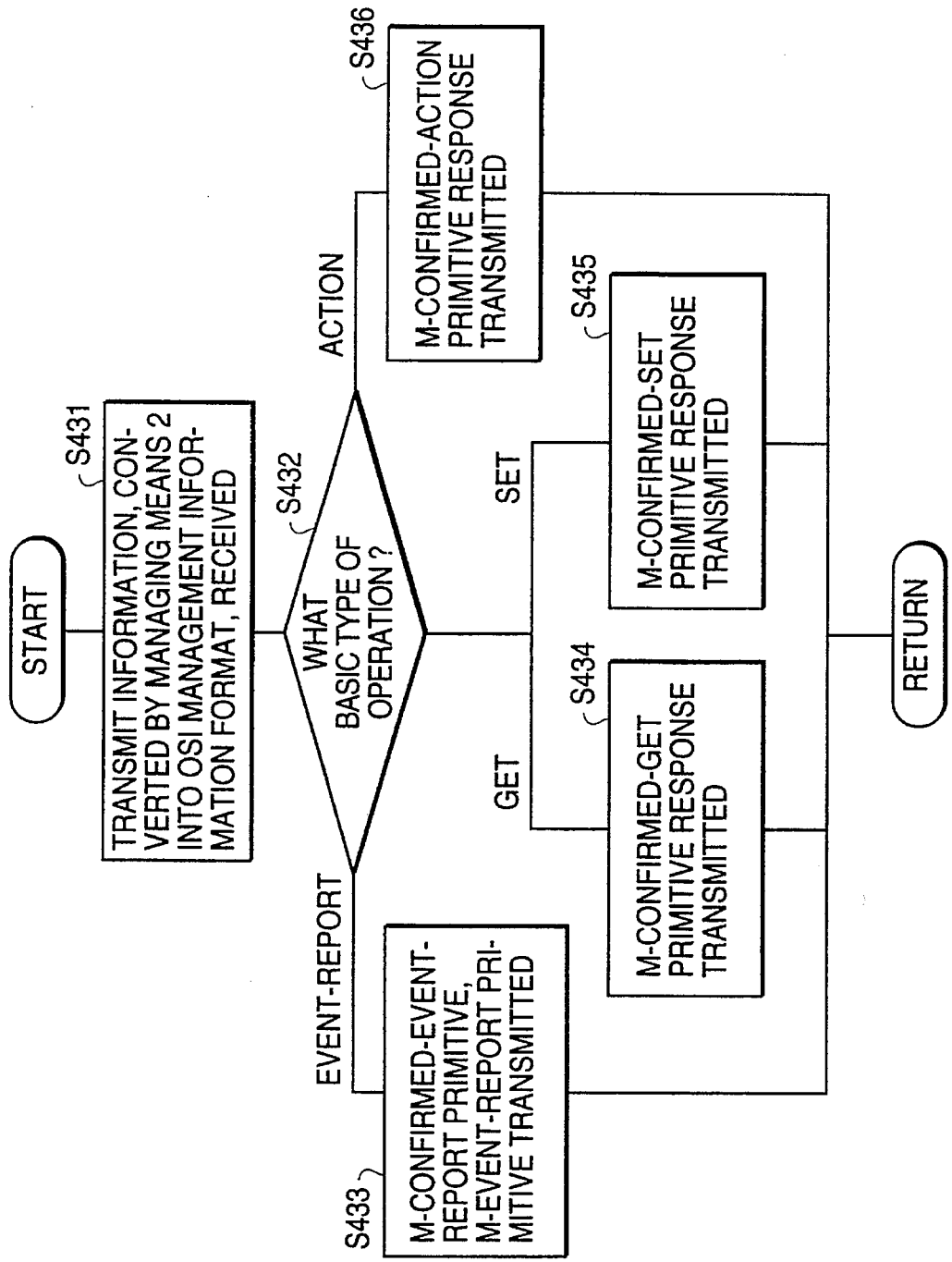
FIG. 8 illustrates details of the transmit processing S43 shown in FIG. 7.
Figure 9:
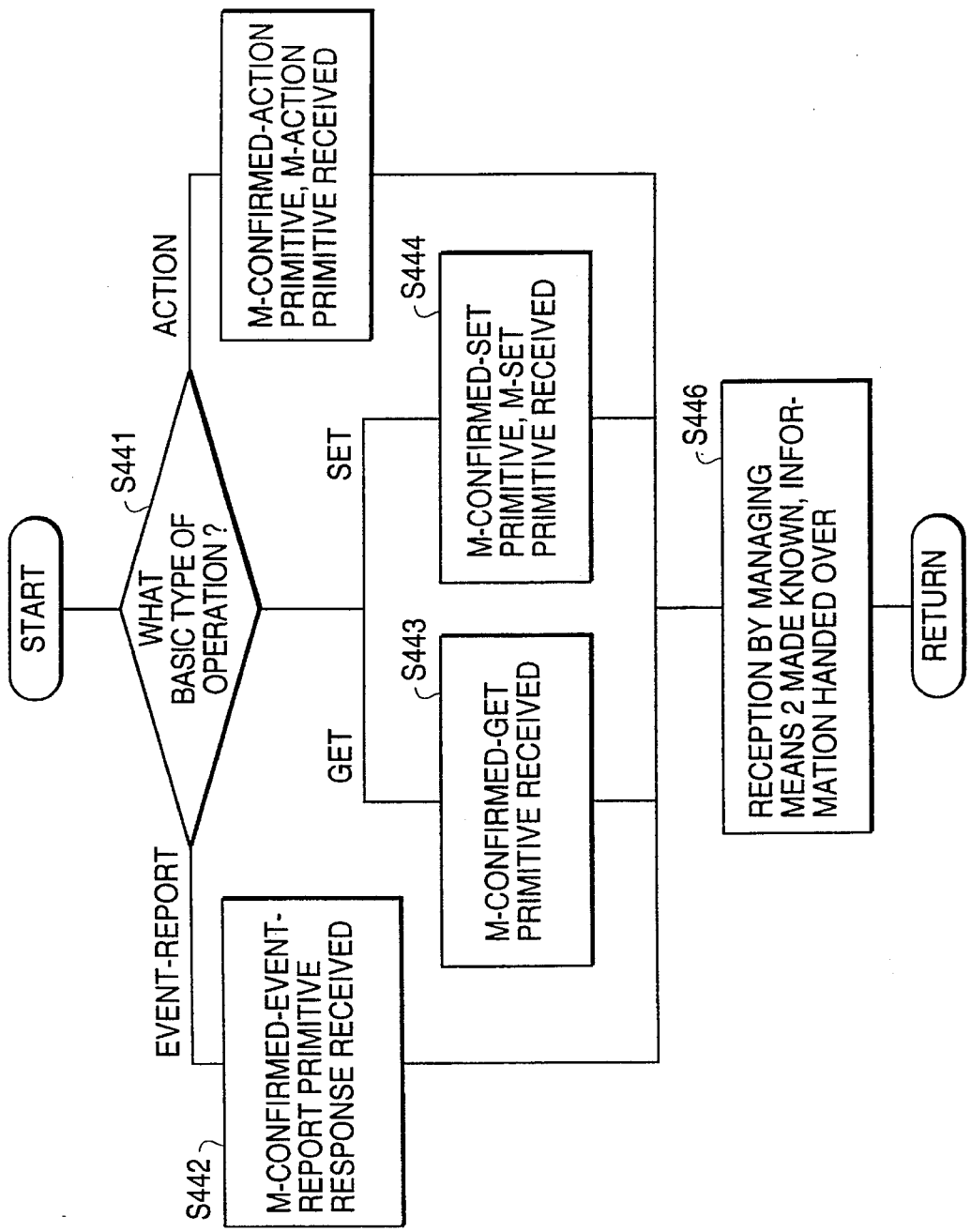
FIG. 9 illustrates details of the receive processing S44 shown in FIG. 7.

FIG. 8 shows in further detail how transmit processing is accomplished at step 43 of FIG. 7. First, transmit information concerning a transmit request from the managing means 2, i.e., information converted into the OSI management information format at step S25 or S33 of FIG. 6, is received (S431). Next, it is determined which type of basic operation the current event concerns (S432), followed by processing matching for the particular type of basic operation. Thus, if it is event reporting, an M-Confirmed-Event-Report primitive and an M-Event-Report primitive are transmitted at step S433, or if it is information getting, an M-Confirmed-GET primitive response is transmitted at step S434. If it is information setting, an M-Confirmed-SET primitive is transmitted at step S435, or if it is an action on the object, an M-Confirmed-Action primitive response is transmitted at step S436.

Below is an outline of the protocol format for issuing requests to the Open System Manager to/from the managed system and the protocol format (1) The protocol format on issuing requests from the Open System Manager to the managed system and from the managed system to the Open System Manager is as follows:

m-Get request:
ISO/IEC 9596-1 Pages 13 and 17 "Get Argument"

m-Cancel-Get-Confirmed request: ISO/IEC 9596-1 Page 13 "Invoke ID Type"

m-Set, m-Set-Confirmed request: ISO/IEC 9596-1 Pages 13, 14 and 19 "Set Argument"

m-Create request: ISO/IEC 9596-1 Pages 13 and 16 "Create Argument"

m-Delete request: ISO/IEC 9596-1 Pages 13 and 17 "Delete Argument"

m-Action, m-Action-Confirmed request: ISO/IEC 9596-1 Pages 12 and 15 "Action Argument"

(2) The protocol format on requesting from the managed system to the Open System Manager is as follows:

m-Event Report, m-Event Report-Confirmed request: ISO/IEC 9596-1 Pages 13 and 17 "Event Report Argument"

The protocol format for replying from the Open System Manager to the managing system and for replying from the managing system to the managed system are outlined below.

(1) The protocol format for replying from the managed system to Open System Manager is as follows:

m-Get reply: ISO/IEC 9596-1 Pages 13 and 18 "Get Result"

m-Cancel-Get-Confirmed reply: ISO/IEC 9596-1 Page "(null)"

m-Set-Confirmed reply: ISO/IEC 9596-1 Pages 14 and 19 "Set Result"

m-Create reply: ISO/IEC 9596-1 Pages 13 and 16 "Create Result"

m-Delete reply: ISO/IEC 9596-1 Pages 13 and 17 "Delete Result"

m-Action-Confirmed reply: ISO/IEC 9596-1 Pages 12 and 16 "Action Result"

(2) The protocol format for replying from the Open System Manager to the managed system is as follows:

m-Event Report-Confirmed reply: ISO/IEC 9596-1 Pages 13 and 17 "Event Report Result."

Referring now to FIG. 9, the following reception processing takes place at step S44 of FIG. 7. First it is determined, at step S441, which type of basic operation the current event concerns, followed by processing matching for the particular type of basic operation. Thus, if it is event reporting, an M-Confirmed-Event-Report primitive response is received at step S442 or, if it is information getting, an M-Confirmed-GET primitive is received at step S443. If it is information setting, an M-Confirmed-SET primitive and an M-SET primitive are received at step S444, or if it is an action on the object, an M-Confirmed-Action primitive and an M-Action primitive are received at step S445. At the next step S446, reception by the managing means is made known, and the received information is provided.

The following conditions are assumed for explaining the information converting means 3.

(1) The spnModem CLASS and the pbx CLASS are defined in FIG. 11 and FIG. 12 respectively, in accordance with the OSI management standards, and using the format (syntax) defined by ISO/IEC 10165-4, incorporated herein by reference.

Further, the agent CLASS is defined in FIG. 13, as the common CLASS between the spnModem CLASS and the pbx CLASS.

The top CLASS (FIG. 14), the operationalState ATTRIBUTE (FIG. 15), and the stateChange NOTIFICATION (FIGS. 16 and 17) are defined in accordance with ISO/IEC 10165-2, incorporated herein by reference.

(2) The relational database of the record format is defined in FIG. 18, for managing the DistinguishedName and attribute. The DistinguishedName, shown in FIG. 18, is an unique name in managed object which the Manager refers.

(a) Management Record for DistinguishedName (FIG. 18 (a))

| | |
|---|---|
| DNID | The integer value being allocated to DN for managing the unfixed length DN. |
| SDNID | The DNID value of the parent for expressing the relationship of parent and child. |
| CLSID | The table for obtaining CLSID of a record. |
| AGTID | The identifier of the record (d) being stored in the communication address for accessing from the computer system (open system agent) to Modems and PBXs which are the real managed apparatus. |
| DELFLG | The flag for expressing deletion. |
| DNLAST | The latter part of the long DN for providing a keyword. |
| DNLEN | The effective length of DN. |
| DN | The unfixed length DistinguishedName. |

(b) Management Record for Attribute (FIG. 18 (b))

| | |
|---|---|
| DNID | The DNID of the managed object including attribute. |
| ATTRID | The integer value being allocated to the unfixed length Attributed (shown in FIG. 16). |
| DELFLG | The flag for expressing deletion. |
| ATTIB | The value of attributeValue (shown in FIG. 16). |
| ATTRLEN | The effective length of ATTRIE. |

(c) Management Record for DNID (FIG. 18 (c))

| | |
|---|---|
| DN | The unfixed length DistinguishedName. |
| DNID | The table for referring to the |

-continued record of FIG. 18 (a) by using DNID corresponding to the DN.

(d) Management Record for accessAddress (FIG. 18 (d))

| AGTID | The identifier of the real managed apparatus. |
|---|---|
| accessaddress | The address being shown by the identifier. The address form differs from CLASS to CLASS. In case of the spnModem CLASS, the address shows the control port number. In case of the pbx CLASS, the address shows the DTE number. |

(e) Management Record for ObjectClass (FIG. 18 (e))

| ObjectClass | The unfixed length ObjectClass (shown in FIG. 17). |
|---|---|
| CLSID | The table for obtaining CLSID of the record of FIG. 18(a). |

(f) Management Record for attributed

| Attributed (FIG. 18 (f)) | The unfixed length Attributed (also shown in FIG. 16). |
|---|---|
| ATTRID | The table for obtaining ATTRID of record (a). |

Figure 19:
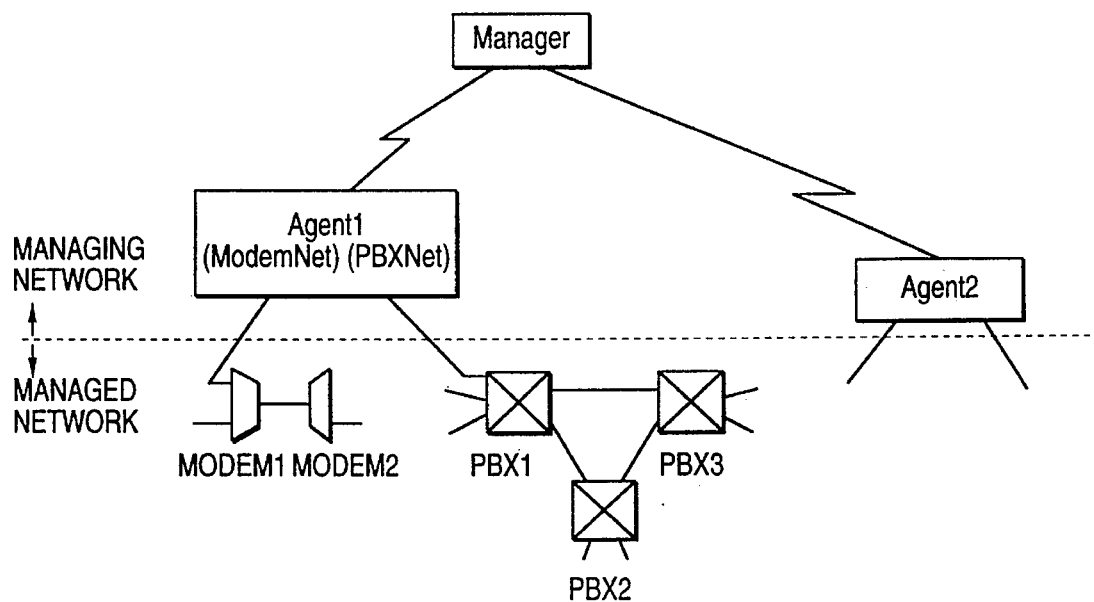
FIG. 19 illustrates an example of a network of open system agents.

(3) The network, which is comprised of the Manager and the Agent1 (ModemNet and PBXNet), is defined in FIG. 19. The Manager and the Agent1 manage the Modem1 and the Modem2 of the spnModem CLASS and PBX1, PBX2, and PBX3 of the pbx CLASS.

Figure 20:
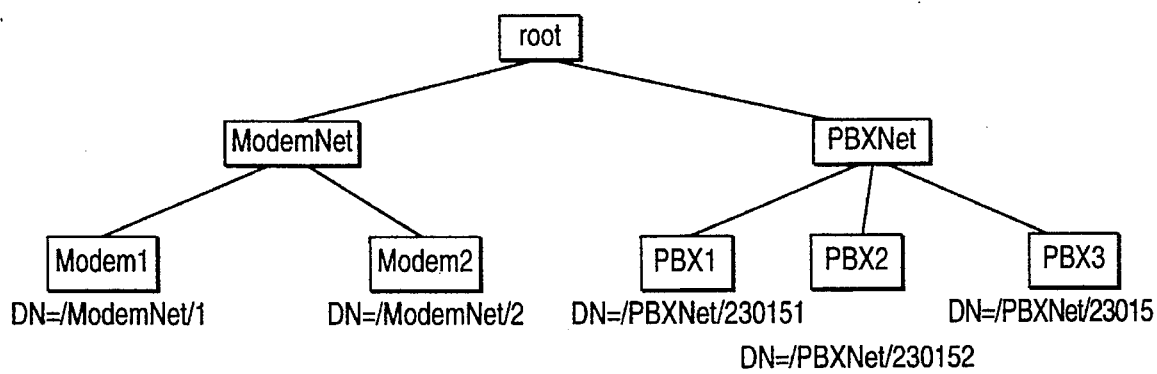
FIG. 20 illustrates the use of Distinguished Names for Modems and PBXs.

(4) Each managed apparatus, which are shown in FIG. 19, is given an unique DN (DistinguishedName) in FIG. 20.

(5) This network is expressed in terms of the management information of FIGS. 18 (a)–(f).

The method of use of the concrete control information in flowcharts is explained below.

(1) Step S52 in FIG. 10 is executed during step S25 of FIG. 6. As shown in FIG. 11 and FIG. 12, because "NOTIFICATIONS" is designated, and because notifying the state change to the Manager is defined in "BEHAVIOUR", step S52 is executed as a result of the decision made during step S24 of FIG. 6.

(2) In S52, "stateChange NOTIFICATION", which is defined in FIG. 14, is encoded and notified to the Manager.

(3) Each element of "ASN.1 notation StateChange structure", which is shown in FIG. 15, is obtained. Next, these elements are included in "m-EventReport" which is shown in FIG. 16, and "m-EventReport" is encoded in accordance with the ASN.1 encoding rule.

(4) The management method of the explanation of the CLASS definition is disclosed in U.S. Pat. No. 5,257,371 incorporated herein by reference.

(5) The management method of "ASN.1 notation", which the data structure being referred from each CLASS definition is defined, is disclosed in U.S. Pat. No. 4,994,998 incorporated herein by reference.

(6) The encoding process for assembling the communication message by giving concrete value to "ASN.1 notation" is disclosed in U.S. Pat. No. 5,263,137 incorporated herein by reference.

(7) During step S27 of FIG. 6, step S53 or step S54 of FIG. 10 is executed in accordance with the operation type being received from the Open System Manager. Because "ACTIONS" is not designated in FIG. 11 and FIG. 12, in the case of this CLASS definition, step S54 is not executed. If "action type" is designated corresponding to the keyword "ACTIONS", step S54 is executed. Furthermore, because only "GET" is designated in "ATTRIBUTES" of the CLASS definition, in the case of this CLASS definition, step S53 is executed when "GET" is executed.

(8) In S53, called from S27 of FIG. 6, the "getArgument" of the "m-Get OPERATION", which is shown in FIG. 17, is decoded, and the number for the internal management is obtained.

The following example shows the case of receiving "m-Get" request to the "operationalState", which is an attribute of Modem1.

"ObjectClass" is included in "BaseManagedObjected", which is shown in FIG. 17; the value is "spnModem". "CLSID=2" is obtained by referring Table 5.

"ObjectInstance" is included in "BaseManagedObjected", which is shown in FIG. 17; the value is "/ModemNet/1". This is a "DistinguishedName". "DNID=2" is obtained by referring Table 3.

"Attributed" is included in "attributedList", which is shown in FIG. 16; the value is "/ModemNet/1". "ATTRID= 35" is obtained by referring Table 6.

(9) The record corresponding to the designated DNID is designated by referring to Table 1, and the validity of the CLSID value is checked by matching two CLSID values. If two CLSID values do not match, an error message is returned to the Manger.

If matched, "AGTID=1" is obtained. Further, by referring to Table 4 one may determine whether the attribute of the apparatus corresponding to "AGTID=1" is the PBX type or the Modem type. The PBX type is managed by the real apparatus. The Modem type is managed by DB(MIB) in the Open System Agent.

In the case of Table 4, because "accessAddress" of "AGTID=1" is "MIB=1", the attribute of the apparatus is managed by the MIB (corresponding to S29 and S30 in FIG. 6).

(10) "RESULT" is defined in the received "m-Get OPERATION" as shown in FIG. 16. Returning a "RESPONSE" to the Manager is needed (corresponding to S32 in FIG. 6).

(11) For encoding "RESPONSE" at step S33 of FIG. 6, that is, for encoding "GetResult" in FIG. 17, firstly, "ATTRIB"="enabled (1)" (ACT) corresponding to "ATTRID=35" is obtained, as shown in table 2. The value "enabled(a)" is stored in the ANY type of "Attribute" which is one of "attributeList", as shown in FIG. 6. The Syntax of the ANY type is decided by the value of "attributed". It is decided that "ASN.1 notation" is "OperationalState", as shown in FIG. 14. It is decided that "GetResult" should be encoded by "ENUMERATED" type, as shown in FIG. 15.

(12) As mentioned above, the method for notifying "m-EventReport" of the OSI management, the method for receiving the "m-Get" request from the Manager, and the method for returning the response message are disclosed.

An example of processing by the information converting means 3 with reference to FIG. 10 will now be described. Referring to FIG. 10, the information converting means 3, responding to a start-up from the managing means 2, proceeds to converting steps S52, S53 and S54 (S51), respectively corresponding to different types of events. Thus, in the case of event reporting, the OSI management format of the type of event (such as trouble occurrence or attribute change) and event information (such as trouble intensity and trouble information, or altered attribute type and altered attribute information) in the ASN.1 descriptive format and the non-open system information format are converted at step S52. In the case of information getting or information setting, the OSI management of attribute type and attribute information in the ASN.1 descriptive format and the non-open system information format are converted at step S53 or, in the case of action on the object, the OSI management of action type (such as test or trace start) and action information (such as test type and test information, or traced object and trace item) in the ASN.1 descriptive format and the non-open system information format are converted. Whether the conversions at steps S52 to S56 should be into the OSI management information format or into the non-open system format is indicated by the managing means 2.

Figure 21:
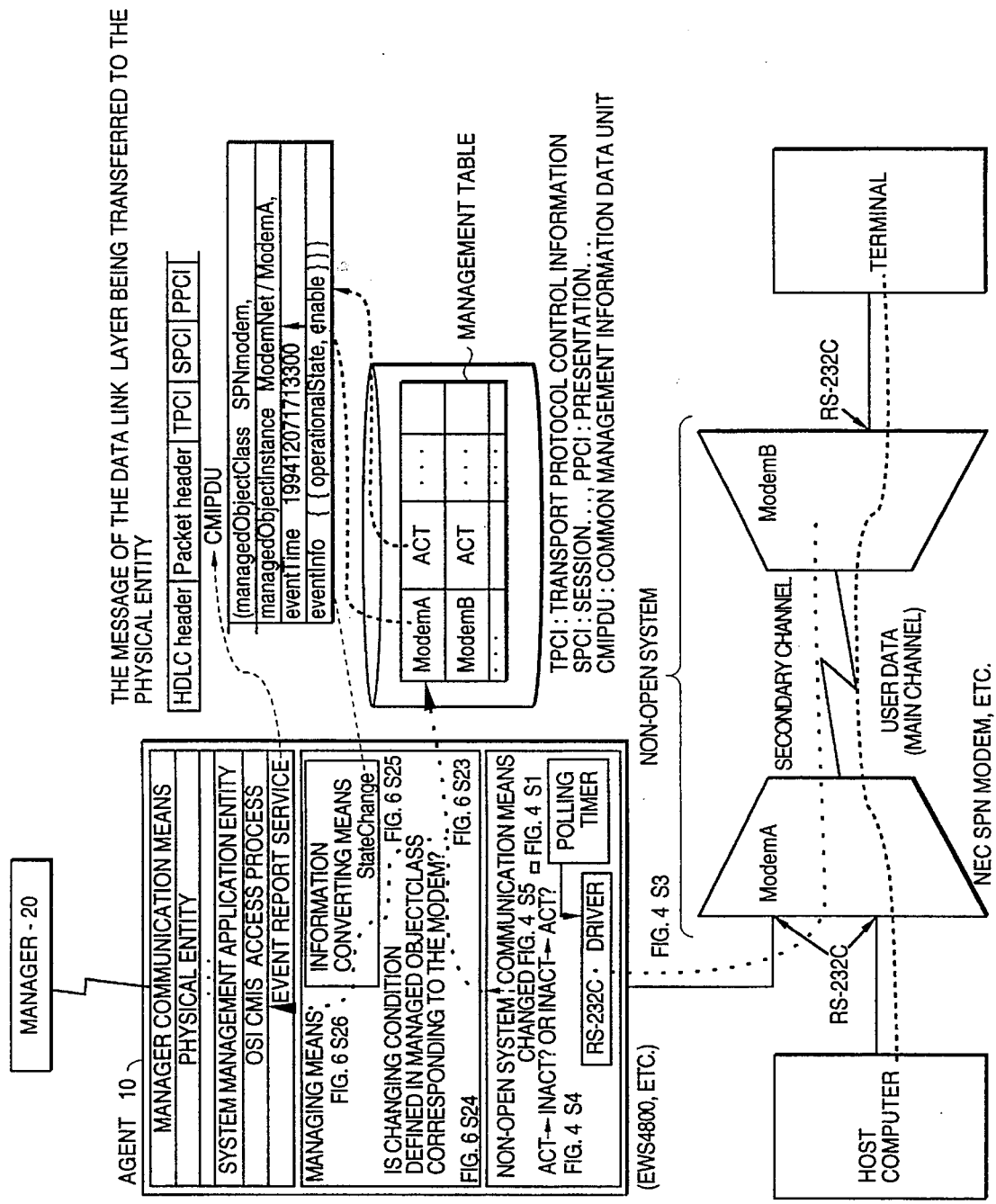
FIG. 21 illustrates an example of the operation of the invention with respect to a particular OSI message.

Another example of the conversion software for the non-open system information to the open system information is shown in FIG. 21. The examples show StateChange NOTIFICATION, which is one of the OSI management message formats.

First, as the non-open system information, the management table of each Modem is provided in a file in the Open System Agent 10. The management table memorizes the condition of the Modem. The condition indicates the "ACT" state or the "INACT" state of the Modem.

Next, the message format corresponding to the Modem whose state is being changed is generated, and is sent to the Open System Manager 20. The message format is called the Common Management Information Protocol Data Unit (CMIPDU) and is shown in FIGS. 16–17. The StateChange NOTIFICATION is called M-EVENT-REPORT CMIPDU. "StateChange NOTIFICATION" is defined as the managedObjectClass corresponding to the modem type.

The information converting means 3 generates the CMIPDU in following manner:

The name of the modem "ModemA" is converted to "ModemNet/ModemA", which can be distinguished by the Open System Manager. "ModemNet/ModemA" is set in the managedObjectInstance of the CMIPDU.

The condition of the Modem "ACT" is changed to "enable" "Enable" is the condition value defined in ISO/IEC 10164-2 (incorporated herein by reference), and is set in the operationalState of the eventInfo parameter of the M-EVENT-REPORT CMIPDU.

The eventTime parameter is then set in the CMIPDU, and finally, the message format CMIPDU, which is provided in ISO/IEC 9595/9596 (incorporated herein by reference), is generated in accordance with the encode rule ISO/IEC 8824/8825 (incorporated herein by reference).

As hitherto described, the system for managing an OSI control system according to the present invention affords the benefit of permitting not only open systems, but also non-open systems, such as MODEM's or PBX's, not having the seven-layer OSI protocol implementation and accordingly being incapable of executing OSI management protocols, to be directly incorporated as managed systems into an OSI management system as defined by the ISO 7498-4 Management Framework or the like.

TABLE 1

Management Records for Distinguished Name

| DNID | SDNID | CLSID | AGTID | DEFLG | DNLAST | DNLEN | DN |
|---|---|---|---|---|---|---|---|
| 1 | 0 | 1 | 0 | 0 | mNet | 9 | /ModemNet |
| 2 | 1 | 2 | 1 | 0 | et/1 | 11 | /ModemNet/1 |
| 3 | 1 | 2 | 2 | 0 | et/2 | 11 | /ModemNet/2 |
| 4 | 0 | 1 | 0 | 0 | XNet | 7 | /PBXNet |
| 5 | 4 | 3 | 3 | 0 | 0151 | 14 | /PBXNet/230151 |
| 6 | 4 | 3 | 4 | 0 | 0152 | 14 | /PBXNet/230152 |
| 7 | 4 | 3 | 5 | 0 | 0153 | 14 | /PBXNet/230153 |

TABLE 2

Management Records for Attribute

| DNID | ATTRID | DELFLG | ATTRIB | ATTRLEN |
|---|---|---|---|---|
| 2 | 35 | 0 | enabled (1) | 6 |
| 3 | 35 | 0 | enabled (1) | 6 |

TABLE 3

Management Records for DNID

| DN | DNID |
|---|---|
| /ModemNet | 1 |
| /ModemNet/1 | 2 |
| /ModemNet/2 | 3 |
| PBXNet | 4 |
| PBXNet/230151 | 5 |
| PBXNet/230152 | 6 |
| PBXNet/230153 | 7 |

TABLE 4

Management Records for accessAddress

| AGTID | accessAddress |
|---|---|
| 0 | MIB = 0 |
| 1 | MIB = 1 |
| 2 | MIB = 2 |
| 3 | DTE = 230151 |
| 4 | DTE = 230152 |
| 5 | DTE = 230153 |

TABLE 5

Management Records for Object Class

| ObjectClass | CLSID |
|---|---|
| agent | 1 |
| spnModem | 2 |
| pbx | 3 |

TABLE 6

| Management Records for AttributeId | |
|---|---|
| AttributeId | ATTRID |
| objectClass | 65 |
| nameBinding | 53 |
| operationalState | 35 |
| portNo | 4 |
| dteAddress | 5 |

What is claimed is:

1. A packaged system, comprising:

open system manager means for operating, on the basis of information in an open systems interconnection (OSI) management information format, as an OSI management center for open systems to provide management in accordance with OSI management protocols;

a plurality of non-open systems for supplying and responding to only information in a corresponding non-open system information format, at least two of said non-open systems having different corresponding formats; and open system agent means, coupled between said open system manager means and said plurality of non-open systems, for causing said non-open systems to appear to said open system manager means as if said non-open systems were operating as open systems, said open system agent means comprising a manager communication unit for communicating with said open system manager means in accordance with OSI management protocols, a non-open system communication unit for communicating with said non-open systems, an information converting unit for converting first input information in an OSI information format into first output information in one of said corresponding non-open system information formats, and for converting second input information in one of said corresponding non-open system information formats into second output information in an OSI information format, and managing means, coupled to said units, for managing said manager communication unit, said non-open system communication unit and said information converting unit by receiving information, including said first and second output information, from said units, processing said information into processed information and transferring said processed information to said units, wherein said open system agent means causes said non-open systems to appear to said open system manager means as if said non-open systems were operating as open systems.

2. The packaged system, as in claim 1, wherein said managing means further supplies said first input information to said information converting unit from said open system manager means via said manager communication unit and further supplies said second input information to said information converting unit from said non-open systems via non-open system communication unit.

3. The packaged system, as in claim 1, wherein said managing means further causes said manager communication unit to provide said first output information from said information converting unit to said open system manager means and further causes said non-open system communication unit to provide said second output information from said information converting unit to said non-open systems.

4. The packaged system, as in claim 1, wherein said managing means further supplies said first input information to said information converting unit from said open system manager means via said manager communication unit, causes said manager communication unit to provide said first output information from said information converting unit to said open system manager means, supplies said second input information to said information converting unit from said non-open systems via said non-open system communication unit, and causes said non-open system communication unit to provide said second output information from said information converting unit to said non-open systems.

5. The packaged system as claimed in claim 1, wherein said non-open systems comprise modems.

6. The packaged system as claimed in claim 1, wherein said non-open systems comprise PBX's.

7. The packaged system as claimed in claim 1, wherein said non-open systems comprise RS-232C interface means for communicating with said non-open system-communication means.

8. The packaged system as claimed in claim 1, wherein said non-open systems further comprise high level data link means for communicating with said non-open system-communication means.

9. The packaged system as claimed in claim 1, wherein said non-open systems comprise X.25 interface means for communicating with said non-open system-communication means.

10. The packaged system as claimed in claim 1, wherein said OSI management protocols comprise physical entity PhE.

11. The packaged system as claimed in claim 1, wherein said OSI management protocols comprise data link entity DE.

12. The packaged system as claimed in claim 1, wherein said OSI management protocols comprise network entity NE.

13. The packaged system as claimed in claim 1, wherein said OSI management protocols comprise physical entity PhE, data link entity DE, network entity NE, transport entity TE, session entity SE, presentation entity PE, and system management application entity SMAE.

14. A packaged system, comprising:

open system manager means for operating, on the basis of information in an open systems interconnection (OSI) management information format, as an OSI management center for open systems to provide management in accordance with OSI management protocols;

a plurality of non-open systems for supplying and responding to only information in one of a plurality of corresponding non-open system information formats; and a plurality of open system agent means, coupled between said open system manager means and said plurality of non-open systems, for causing said non-open systems to appear to said open system manager means as if said non-open systems were operating as open systems, each of said open system agent means comprising a manager communication unit for communicating with said open system manager means in accordance with OSI management protocols, a non-open system communication unit for communicating with said non-open systems, an information converting unit for converting first input information in an OSI information format into first output information in one of said corresponding non-open system information formats, and for converting second input information in a non-open system information format into second output information in an OSI information format, and managing means, coupled to said units, for managing said manager communication unit, said non-open system communication unit and said information converting unit by receiving information, including said first and second output information, from said units, processing said information into processed information and transferring said processed information to said units, wherein said open system agent means causes said non-open systems to appear to said open system manager means as if said non-open systems were operating as open systems.

15. The packaged system as claimed in claim 14, wherein said non-open systems comprise modems.

16. The packaged system as claimed in claim 14, wherein said non-open systems comprise PBX's.

17. A method for coupling an open system manager to non-open systems, at least two of said non-open systems having different non-open system information formats, said method comprising the steps of:

providing a non-open system communication with said non-open systems using a non-open system-communication unit coupled to said non-open systems;

providing an open system type of communication with said open system manager in accordance with open system interconnection (OSI) management protocols using a manager-communication unit coupled to said open system manager;

converting first input information in one of said different non-open system information formats provided by said non-open system-communication unit into first output information using an information converting unit;

converting second information in an OSI management information format provided by said manager-communication unit into second output information using said information converting unit;

providing said first output information and said second output information to a managing unit; and processing information, including said first output information and said second output information, in said managing unit to make said non-open systems appear to said open system manager as systems managed in accordance with said OSI management protocols, said managing unit managing said information converting unit, said non-open system-communications unit and said manager-communication unit.

18. The method, as in claim 17, wherein operation of said open system type of communication communicating step further comprise the steps of:

awaiting an event indication for communicating with said open system manager, determining whether said event indication is for a first event relating to transmitting information to said open system manager or a second event relating to receiving information from said open system manger, initiating transmit processing upon indication of said first event, and initiating reception processing upon indication of said second event.

19. The method, as in claim 18, wherein said initiating transmit processing step comprises the steps of:

receiving said first output information from said information converting unit;

determining a basic type of operation indicated by said first output information; and transmitting a primitive signal corresponding to said basic type of operation to said open system manager.

20. The method, as in claim 19, wherein said transmitting step comprises the steps of:

if said type of operation is event-report, transmitting an M-Confirmed-Event Report primitive signal and an M-Event-Report primitive signal, if said type of operation is information getting, transmitting an M-Confirmed-Get primitive response signal, if said type of operation is information setting, transmitting an M-Confirmed-Set primitive signal, and if said type of operation is action, transmitting an M-Confirmed-Action primitive response signal.

21. A method for coupling an open system interconnect (OSI) manager to non-open system devices via an agent system connected between said OSI manager and said non-open system devices, said method comprising the steps of:

(a) detecting an occurrence of an event in said agent system;

(b) determining whether said event is conveyed from one of said open system devices or said OSI manager;

(c) if said event is conveyed from said one of said open system devices performing the steps of,
  i. storing event information of said event as management information,
  ii. judging whether said event should be made known to said OSI manager,
  iii. if said event is to be made known to said OSI manager converting said event information to an OSI management information format, otherwise waiting for occurrence of another event, and
  iv. transmitting said converted information to said OSI manager;

(d) if said event is conveyed from said OSI manager performing the steps of,
  i. converting said event information into a non-open system information format corresponding to a non-open system device indicated by said event,
  ii. registering said event information,
  iii. judging whether access to said non-open system device indicated by said event is required, and
  iv. if access to said non-open system device indicated by said event is required, transmitting said converted event information to said non-open system device indicated by said event, otherwise executing said event information within said agent system.

22. A method according to claim 21, wherein said step (d) further comprises the steps of:

v. determining whether a response to said OSI manager is required;

vi. if a response is required, converting response information into said OSI management information format, otherwise waiting for occurrence of another event, and vii. transmitting said converted response to said OSI manager.

* * * * *